US008601397B2

(12) United States Patent
Marcy et al.

(10) Patent No.: US 8,601,397 B2
(45) Date of Patent: Dec. 3, 2013

(54) SYSTEM AND METHOD FOR GROUPING A COLLECTION OF DOCUMENTS USING DOCUMENT SERIES

(75) Inventors: Wayne Marcy, Ocean, NJ (US); Hood Qa'Im-maqami, Montclair, NJ (US)

(73) Assignee: Barclays Capital Inc., New York, NY (US)

( * ) Notice: Subject to any disclaimer, the term of this patent is extended or adjusted under 35 U.S.C. 154(b) by 116 days.

(21) Appl. No.: 11/290,230

(22) Filed: Nov. 30, 2005

(65) Prior Publication Data

US 2006/0224605 A1  Oct. 5, 2006

Related U.S. Application Data

(60) Provisional application No. 60/667,105, filed on Mar. 31, 2005.

(51) Int. Cl.
*G06F 3/048* (2013.01)
*G06F 17/00* (2006.01)

(52) U.S. Cl.
USPC ........................... 715/853; 715/254; 715/277

(58) Field of Classification Search
USPC ................ 715/254, 277, 810, 235, 230, 853; 707/5; 717/124; 709/205
See application file for complete search history.

(56) References Cited

U.S. PATENT DOCUMENTS

| 5,832,470 | A | 11/1998 | Morita et al. |
| 6,014,662 | A | 1/2000 | Moran et al. |
| 6,112,201 | A * | 8/2000 | Wical ................................. 707/5 |
| 6,594,654 | B1 * | 7/2003 | Salam et al. ........................... 1/1 |
| 6,732,090 | B2 * | 5/2004 | Shanahan et al. ................. 707/3 |
| 6,857,105 | B1 * | 2/2005 | Fox et al. ........................ 715/825 |
| 6,915,299 | B1 * | 7/2005 | Arcuri et al. ................... 707/100 |
| 7,085,755 | B2 * | 8/2006 | Bluhm et al. ...................... 707/3 |
| 7,107,518 | B2 * | 9/2006 | Ramaley et al. .............. 715/235 |
| 7,149,983 | B1 * | 12/2006 | Robertson et al. ............. 715/810 |
| 7,194,677 | B2 * | 3/2007 | Rizk et al. ...................... 715/205 |
| 7,263,655 | B1 * | 8/2007 | Carden, Jr. ..................... 715/234 |
| 7,290,222 | B2 * | 10/2007 | Guido et al. ................... 715/853 |
| 7,315,848 | B2 * | 1/2008 | Pearse et al. .......................... 1/1 |
| 7,757,162 | B2 * | 7/2010 | Barrus et al. ................... 715/230 |
| 2002/0019827 | A1 * | 2/2002 | Shiman et al. ................. 707/200 |
| 2004/0172450 | A1 * | 9/2004 | Edelstein et al. ............. 709/205 |
| 2005/0015742 | A1 * | 1/2005 | Wood et al. ................... 717/101 |

FOREIGN PATENT DOCUMENTS

| EP | 0704810 | 4/1996 |
| JP | 8153121 | 6/1996 |
| JP | 2000276494 | 10/2000 |

OTHER PUBLICATIONS

Lotus, "Using Lotus Knowledge Discovery System", Release 1, copyright 2001 Lotus Development Corporation, pp. 1-198.*

(Continued)

*Primary Examiner* — Omar Abdul-Ali
*Assistant Examiner* — Andrew Tank
(74) *Attorney, Agent, or Firm* — Morgan Lewis & Bockius, LLP

(57) ABSTRACT

A system and method that allows a publisher to create a document series, associate a document with a document series and present to an end-user a series nugget displaying at least one document associated with the document series. Document series information may be inherited by each document in the document series. Document series information is stored in an asset database.

24 Claims, 7 Drawing Sheets

(56) References Cited

OTHER PUBLICATIONS

Rein et al., "A Case for Document Management Functions on the Web", Magazine Communications of the ACM, vol. 40 Issue 9, Sep. 1997, copyright ACM 1997.*
Kohonen, "Self-Organization of Very Large Document Collections: State of the Art", In Proceedings of the International Joint Conference on Neural Networks, vol. 2, Piscataway, NJ, copyright IEEE 2000.*
Pohs et al., "The Lotus Knowledge Discovery System: Tools and Experiences", *IBM Systems Journal*, vol. 40, NO. 6, 2001, pp. 956-966.
European Search Report dated Apr. 1, 2010 of EP 05852935.5 (4 pages).
Communication Pursuant to Article 94(3) EPC, EP 05852935.5 dated Nov. 19, 2010 (5 pages).
International Preliminary Report on Patentability, PCT/US2005/043873, Apr. 16, 2009 (7 pages).
International Search Report and Written Opinion, PCT/US2005/043873 dated Jul. 7, 2008 (9 pages).
JP First Office Action dated May 17, 2011 for Japanese Application No. 2008504016, 10 pages.
Hisashi Shimamura et al., A Domain Clustering for WWW Document Search, IPSJ SIG Notes, Japan, Information Processing Society of Japan, Mar. 13, 1998, vol. 98, No. 22, pp. 7-12.
European Patent Application No. 05852935.5, Extended European Search Report, dated Jan. 4, 2010, 4 pages.
Japanese Patent Application No. 2008-504016, Decision of Rejection, dated May 29, 2012, 8 pages.
Japanese Patent Application No. 2011-247543, Notice of Reasons for Rejection, dated Nov. 27, 2012, 5 pages.
Brush et al., "Notificatin for Shared Annotation of Digital Documents", CHI Letters, Apr. 2002, 4(1), 8 pages.
Salton, "Developments in Automatic Text Retrieval", Science, Aug. 1991, 253(5023), 7 pages.

* cited by examiner

SYSTEM AND METHOD FOR GROUPING A COLLECTION OF DOCUMENTS USING DOCUMENT SERIES

CROSS-REFERENCE TO RELATED APPLICATIONS

This application claims the benefit of prior filed U.S. provisional application Ser. No. 60/667,105, filed Mar. 31, 2005, which is incorporated herein by reference in its entirety.

BACKGROUND OF THE INVENTION

1. Field of the Invention

The present invention relates to document management systems and methods. More specifically, the invention relates to systems and methods for automatically associating a document to a document series.

2. Description of the Related Art

The usefulness of document management systems are known and are widely used in large organizations or departments. A user can quickly retrieve a document from these systems while being assured that the documents stored in these systems are properly backed up. Locating and retrieving documents depends on the metadata associated with each document. The ease of locating or publishing a document increases as more metadata about the document is associated with the document. The user, however, usually enters Metadata, and if the amount of metadata required becomes burdensome to the user, the user may not enter the required data. Therefore, there remains a need for systems and methods that encourage a user to enter metadata for each document and preferably to automatically store, maintain, and attach metadata to a document.

SUMMARY OF THE INVENTION

A system and method that allows a publisher to create a document series, associate a document with a document series and present to an end-user a series nugget displaying at least one document associated with the document series. Document series information may be inherited by each document in the document series. Document series information is stored in an asset database.

One embodiment of the present invention is directed to a computer implemented method comprising the steps of: creating a document series nugget, the document series nugget placed on a web page presented to an end-user; creating a document series, the document series presented in the document series nugget; and associating a document to the document series, the document series presenting the document in a list of documents in the document series.

Another embodiment of the present invention is directed to a system for managing a document series via a user interface, the document series having a document associated with the document series, the system comprising: a first database storing metadata characterizing the document series, the metadata accessed by a key; a second database storing the key; a first component configured to retrieve the document series metadata from the first database through the key stored on the second database and passing the retrieved metadata to the user interface; and a second component configured to receive document metadata from a user through the user interface, the document metadata including an association with the document series.

BRIEF DESCRIPTION OF THE DRAWINGS

The invention will be described by reference to the preferred and alternative embodiments thereof in conjunction with the drawings in which:

FIG. 4 is a portion of another web page or popup window presented to a publisher in an embodiment of the present invention;

FIG. 5 is a portion of another web page or popup window presented to a publisher in an embodiment of the present invention;

DETAILED DESCRIPTION

The description herein should be understood to describe only one preferred embodiment of the invention. Those skilled in the art will recognize, for example, that the described embodiment is just one simplified example of the novel system and method of document series management. The simplified example is all that needs to be described in detail in order to enable the more general system and method that the invention comprises.

Figure 1:
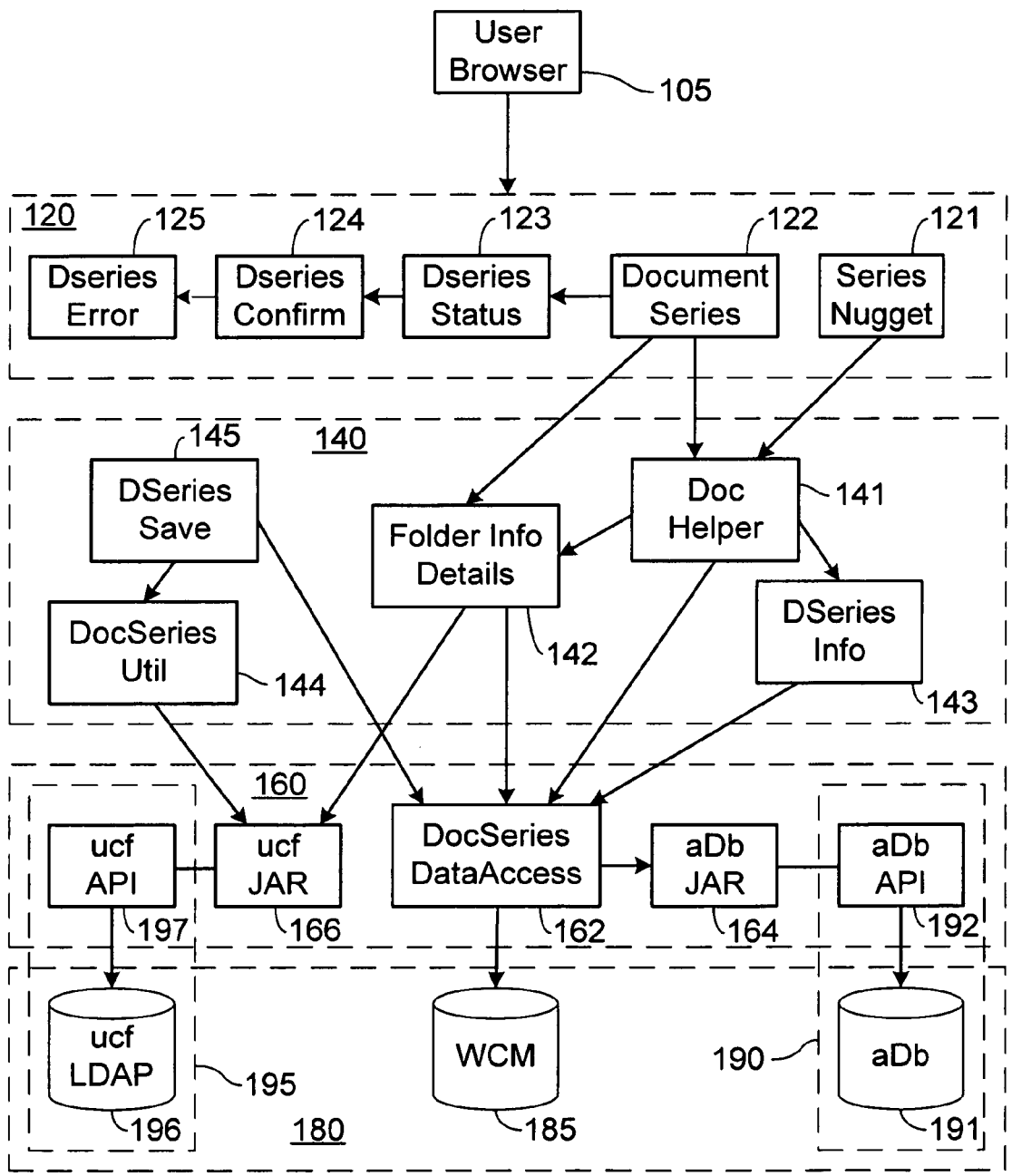
FIG. 1 is a deployment diagram for an embodiment of the present invention.

FIG. 1 is a deployment diagram for an embodiment of the present invention. In FIG. 1, a presentation tier 120 includes software components that interface with a publisher. As used herein, a publisher refers to a person who publishes a document to a web page for viewing by end-users on a network. A publisher may be the creator of the document or may be one of a group of editors that update the document. In a preferred embodiment, a publisher may create, edit, and delete a document. The publisher publishes a document by placing the document in a shared folder that may be placed on a web page that is available to the end-users of the network.

In a preferred embodiment, the publisher interacts with the presentation tier 120 through a user interface such as, for example, a web browser 105. The presentation tier 120 populates a web page presented to the publisher's browser with information provided from a business tier 140, retrieves information entered by the publisher, and passes the entered information to the business tier 140. An integration tier 160 receives information requests from the business layer 140 and queries and retrieves information from a resource tier 180.

The resource tier 180 may include one or more database systems that store portions of the information displayed on the end-user's browser. In the embodiment shown in FIG. 1, the resource tier 180 includes a user collection framework (UCF) database 196 that stores the group/individual access lists for each document series. The UCF database may be a lightweight directory access protocol (LDAP). An UCF application program interface (API) 197 provides an interface between the UCF LDAP and an UCF JAR component in the integration tier 166. The UCF JAR component is preferably a JAVA component that receives information requests from the business layer 140, formulates a query request to the LDAP database, transmits the query request to the LDAP API 197, retrieves information from the LDAP API, and passes the information to the business layer 140.

Similarly, document series metadata may be stored in an asset database (aDb) 191 in the resource tier 180. An example of an aDb is described in co-pending application Ser. No. 11/025,871 filed Dec. 29, 2004 entitled, "System and Method for Corporate-wide Policy Management," which is incorporated herein by reference in its entirety. An aDb API 192 provides an interface to query the aDb 191. An aDb JAR component 164 builds a query request based on information provided by a document series data access component 162, sends the query request to the aDb API 192, retrieves information from the aDb API 192, and forwards the retrieved information to the document series data access component 162.

A web content management (WCM) database 185 stores document series and folder keys that are used to retrieve the metadata from aDb and is accessed through a document series data access component 162 in the integration tier 160.

The business tier 140 includes one or more software components that manage the metadata for each document and provide document metadata to the presentation tier 120. When a publisher creates a document series and saves the series, a document series save component 145 is invoked to save the document series information. The series save component 145 invokes a document series utility component 144 that saves the group information associated with the saved document series. The series save component 145 also invokes the series data access component 162 in the integration tier 160 to save the document series metadata as an asset in the aDb 191. A key for the new document series is returned from aDb 191 and is stored in the WCM database 185.

The presentation tier 120 includes one or more software components that populate the publisher's browser page with the relevant document metadata. A series nugget component 121 retrieves document series information based on the publisher and displays the document series associated with a folder on the document series edit screen.

A document series component 122 retrieves metadata for a document series selected by the publisher and displays the series metadata on the document series edit screen. The document series component 122 invokes a document helper component 141 and a folder information details component 142 in the business tier 140 to retrieve the document series and folder metadata for the selected document series and displays the retrieved metadata on the document series edit screen. The document helper component 142 invokes a document series information component 143 that retrieves the document series information from the integration tier 160.

A document series status component 123, a document series confirm component 124, and a document series error component 125 provide information to the publisher regarding the status of an operation invoked by the user. For example, when a publisher saves a newly created document series, the document series status component 123 may be invoked to display a message giving the status of the save operation. If the save operation is successful, the document series confirm component 124 is invoked to display a message to the publisher confirming that the save operation completely successfully. If the save operation is unsuccessful, the document series error component 125 is invoked to display a message to the publisher indicating that an error occurred during the save operation.

Figure 2:
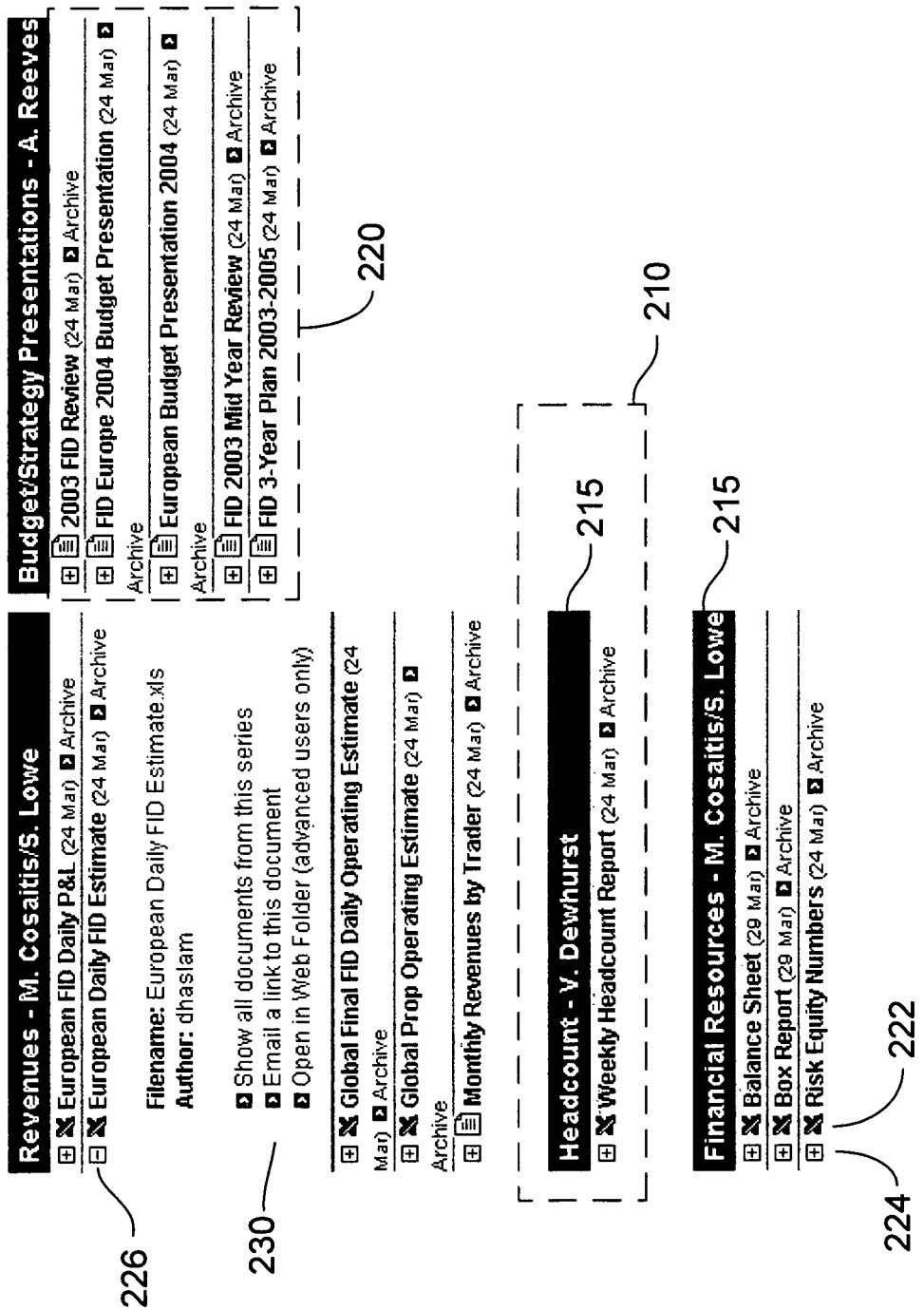
FIG. 2 is a portion of a view presented to an end-user in an embodiment of the present invention.

FIG. 2 is a portion of a view presented to an end-user in an embodiment of the present invention. FIG. 2 displays four document series nuggets and is preferably part of a web page that the end-user may view from his/her web browser. As used herein, a nugget refers to a portion of a displayed web page where information is formatted and presented to the viewer. In a preferred embodiment, a nugget may be created using formatting templates and associating a list of items that is displayed in the nugget to the nugget. The list may be a result of a search or database query that is executed prior to the display of the nugget. Co-pending application Ser. No. 10/903,373 filed Jul. 30, 2004 entitled "System and Method for Data Collection and Processing," incorporated herein by reference in its entirety, describes an application and method that may be used by a publisher to create a nugget and place it on a web page. Each document series nugget 210 displays a series nugget title 215 and a list of documents 220 belonging to that document series. The list of documents 220 lists one or more of the documents associated with the document series. For each document in the document list 220, a document title, publication date of the document, and an icon 222 indicating the document's file type is presented in the list. An end-user may view a document by selecting the document.

An expand icon 224 or a contract icon 226 may be displayed by each document in the document list that presents, when the expand icon is selected, or hides, when the contract icon is selected, a list of operations 230 that may be performed on the document. In the expanded state, the document's filename and author are displayed. The end-user may view the document by, for example, clicking on the document's filename. The end-user may select the author to send the author an email or instant message to the author. In alternative embodiments, clicking on the author hyperlink may cause the end-user's display to display the author's web page or invoke a people finder applet that displays information about the author. An example of a people finder applet is described in co-pending application Ser. No. 11/025,871 filed Dec. 29, 2004 entitled, "System and Method for Corporate-wide Policy Management."

The expanded state may include one or more icons or hyperlinks that, when selected, performs an operation on the document. For example, a document details hyperlink may execute a script that displays the document details in a popup window. In another example, a show all documents hyperlink may execute a script that causes the end-user's web page to show a list of all documents associated with the document series. In another example, an email icon, when selected, displays an email window where the end-user can email a link to the document to another person. In another example, a document series details hyperlink may execute a script that displays the details of the document series associated with the document. In another example, a delete hyperlink may execute a script that deletes the document. Other operations associated with the document may be presented to the end-user in the expanded state.

In a preferred embodiment, each document series nugget 210 shown in FIG. 2 may have a different publisher and the documents each document series may stored in different folders independently of the other folders. In such a situation, each publisher may maintain control over their documents while providing a common web page where end-users may view the documents.

Figure 3:
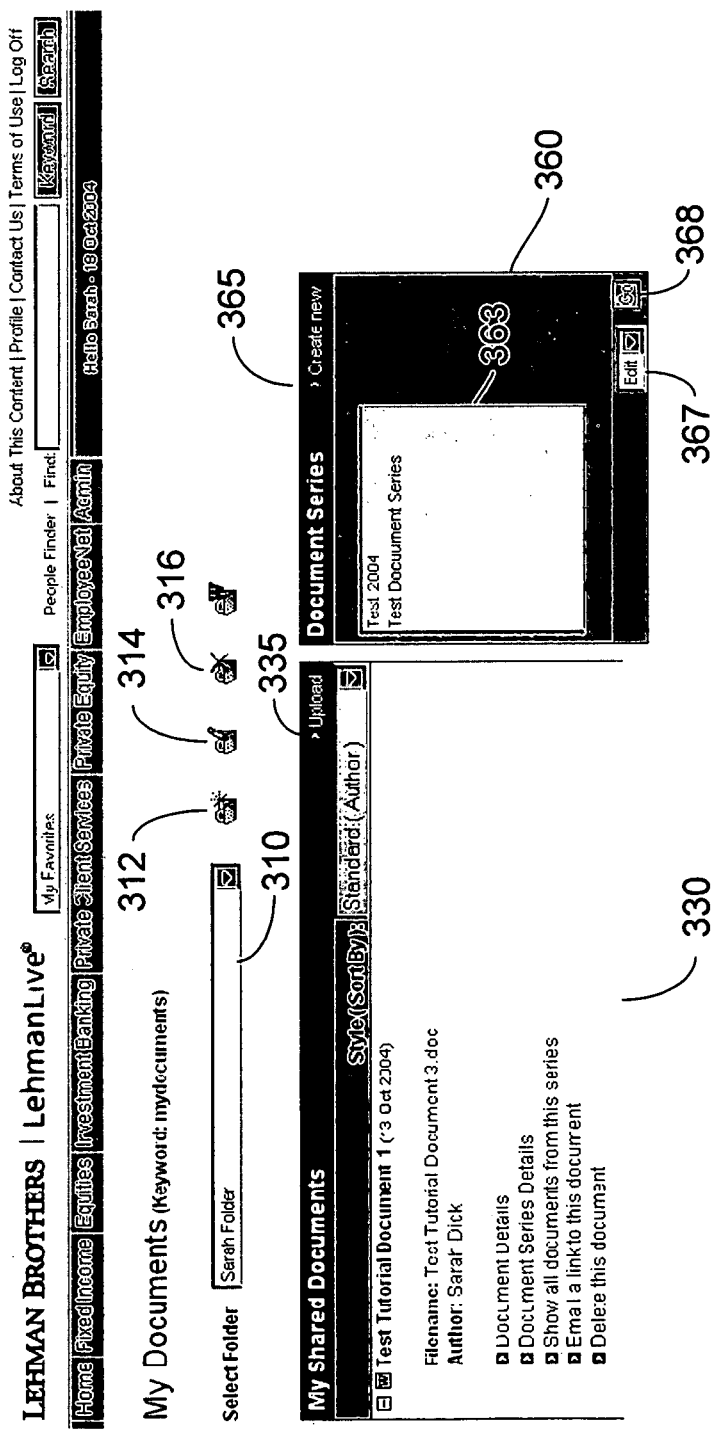
FIG. 3 is a portion of a web page presented to a publisher in an embodiment of the present invention.

FIG. 3 is a portion of a web page presented to a publisher in an embodiment of the present invention. The web page shown in FIG. 3 allows the publisher to manage the documents in one or more document series and to manage folders. A drop-down box 310 indicates a selected folder containing documents that may be associated with a document series. A new folder icon 312, a share/edit folder icon 314, and a delete folder icon 316 may be displayed thereby allowing the publisher to create a new folder, edit the properties of a folder, or delete a folder, respectively. When a new folder is created or edited, an administrator can define a group or an individual as having different levels of permissions to access or edit the folder. The permissions defined for each folder preferably apply to all documents contained in, or associated with, the folder. In some embodiments, for example, an administrator is allowed to edit and upload all documents in the folder and can manage permissions for that folder. An editor may edit and upload all documents in the folder but cannot manage the permissions for that folder. A viewer, or end-user, may view documents stored in the folder but may not edit any documents or manage permissions for that folder. Individuals or groups may be selected using a people finder editor as described in co-pending application Ser. No. 11/025,871 filed Dec. 29, 2004 entitled, "System and Method for Corporate-wide Policy Management." In some embodiments, a viewer default group includes all employees of a company. Once the administrator has defined the permissions for the folder, the groups allowed administrator, editor, or viewer permission for that folder are stored in the UCF LDAP.

A shared documents nugget 330 displays a list of previously uploaded documents that the publisher is permitted to edit. The publisher may upload a selected document to a document management system and/or associate the selected document with an existing or newly created document series. A document series list nugget 360 displays a list of existing document series 363 that the publisher may associate documents. A create new icon 365 allows the publisher to create a new document series.

FIG. 3 shows a shared document nugget 330 containing one document. The document in FIG. 3 is shown in an expanded view that is similar to the expanded document view presented to the end-user, as shown in FIG. 2, but with the addition of functions to display the document details, to display the document series details, and to delete the document. The publisher may upload the selected document by selecting an upload icon 335.

Figure 4:
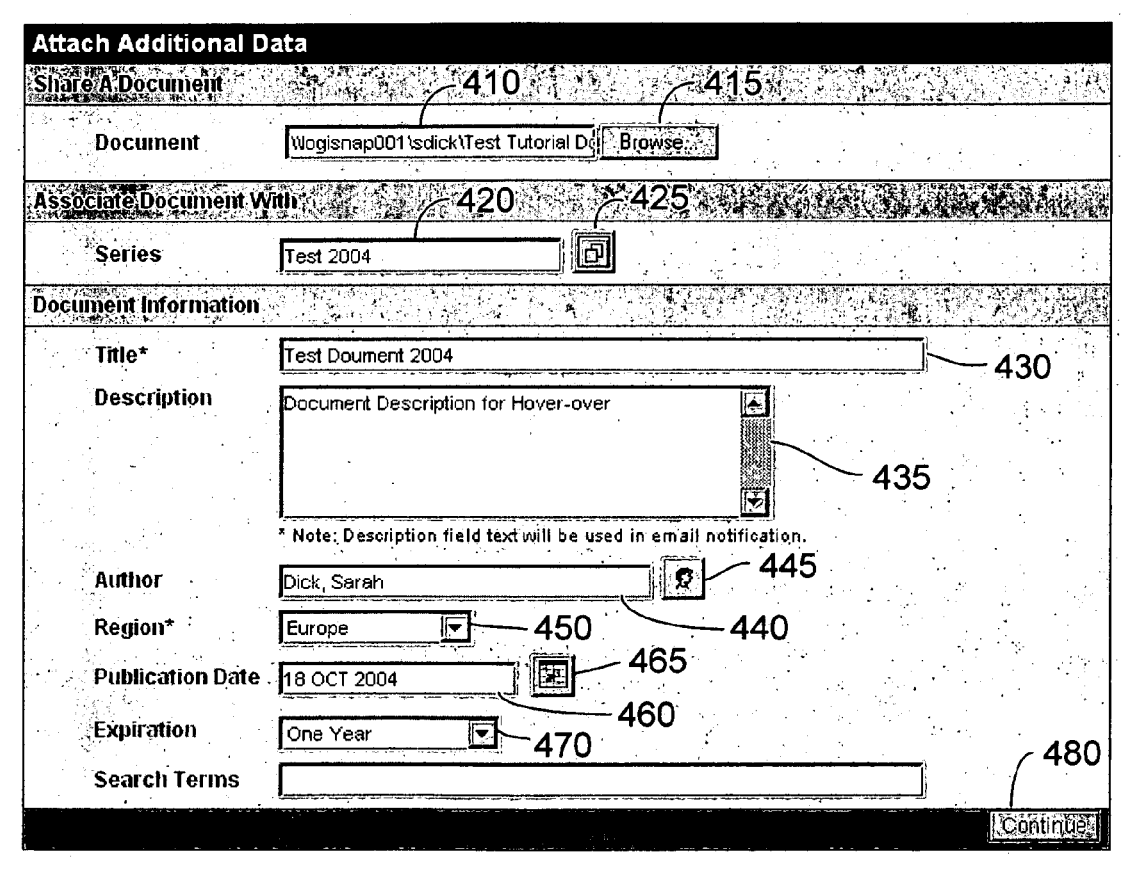

FIG. 4 is a portion of a web page or popup window that is displayed to the publisher when the upload icon 335 is selected. In FIG. 4, the popup window displays at least one field containing information relating to the selected document such as, for example, document filename 410, series name 420, document title 430, document description 435, author 440, region 450, publication date 460, and expiration period 470. A browse button 415 is provided to allow the publisher to select a document by browsing a list of documents. The document filename field 410 is pre-populated with the filename of the selected document. The series name field 420 may be pre-populated with the document series name if the document series is selected as the default document series for the particular folder the user is uploading to. A browse icon 425 may be provided to allow the publisher to select a document series from a list of document series that they are entitled to associate to the current document. The document title field 430 may be pre-populated with the document's filename and the publisher may enter a different document title into the document title field 430. The document description field 435 allows the publisher to enter a short description of the document that may be provided for hover-overs such that the description is displayed when the end-user's cursor hovers over the displayed document title. The author field 440 may be pre-populated with the name of the document's author. A select icon 445 may be provided to change the author if the displayed author is not the publisher. In some embodiments, the select icon 445 displays a list of the document's permitted administrators and editors when the select icon is selected. The region field 450 may be pre-populated with the region associated with the author and may be obtained from an aDb query. The region field 450 may be displayed as a drop-down box such that the publisher can select a region from a region list. The publication date field 460 may be pre-populated with the current date. A calendar icon 465 may be provided to select a different publication date. The expiration field 470 may be a drop-down box where a publisher can select a period after which the document is removed or considered no longer valid. After the publisher has entered or review the information displayed on the popup window, the publisher may select a continue button 480 to save the information in the popup window.

Figure 5:
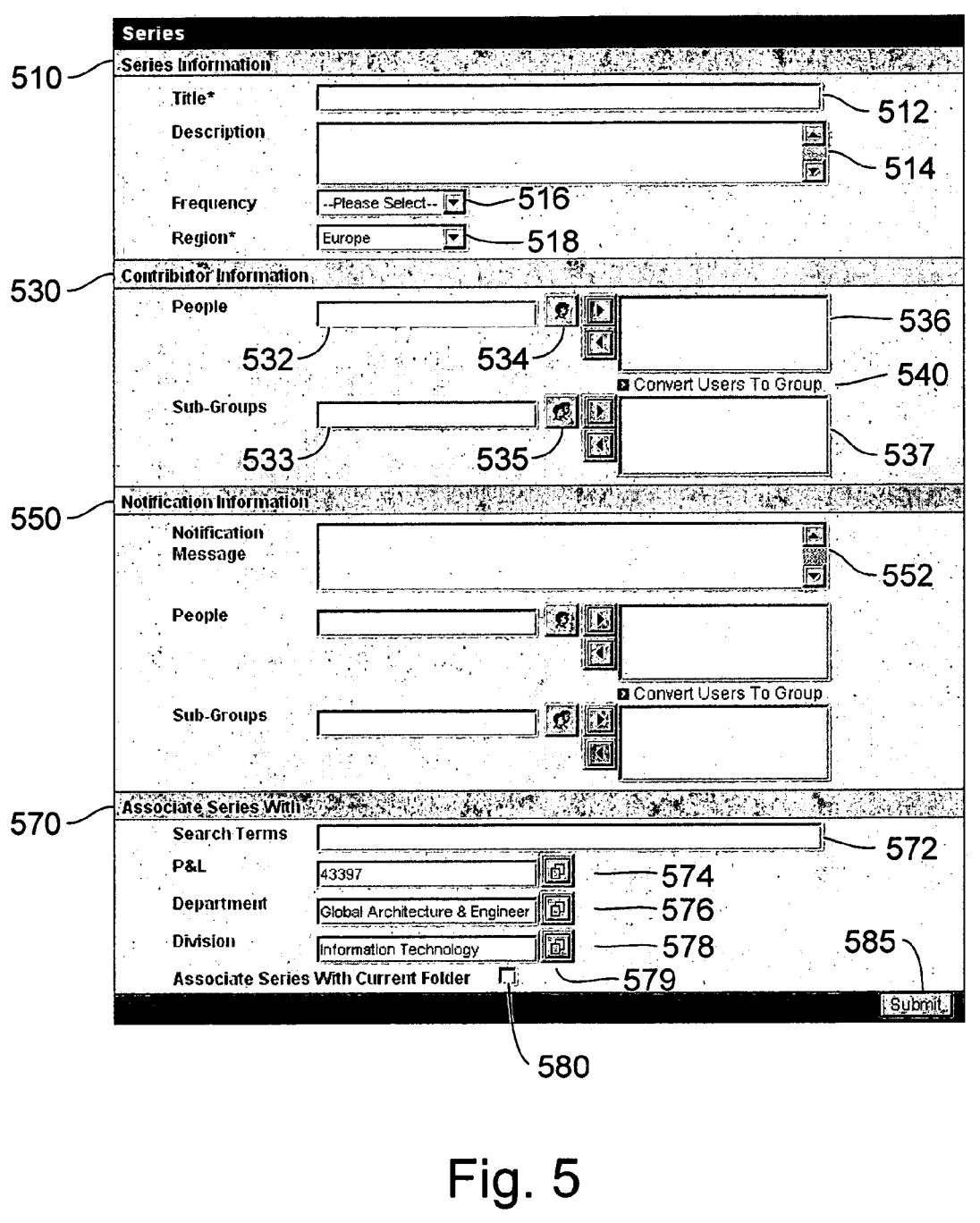

FIG. 5 is a portion of a web page or popup window that is displayed to the publisher when the create new icon 365 in the document series nugget 360 is selected by the publisher. The web page or popup window is also displayed when the publisher selects a document series in the document series list 363, selects edit in a drop-down box 367, and selects or clicks on a Go button 368.

The popup window shown in FIG. 5 includes a series information section where the publisher can enter information describing the document series, a contributor information section where the publisher can add people or groups to a list of editors allowed to edit and upload documents to the document series, a notification information section where the publisher can add people or groups to a list of persons that are notified when a document associated to the document series is modified, and an association information section where the publisher can associate the document series to an organizational entity such as, for example, a P&L group, a division, and/or a department.

The series information section 510 includes a document series title field 512 where the publisher can enter a document series title. A description field 514 allows the publisher to enter a short description of the document series that may be displayed on a document series dashboard nugget when a cursor hovers over the document series title. A frequency drop-down box 516 allows the publisher to indicate the upload frequency of documents in the document series. A region drop-down box 518 allows the publisher to indicate the region associated with the document series.

The contributor information section 530 includes a person field 532 and a group field 533 where the publisher can enter a person or group, respectively, that are allowed to associate a document to the document series. A person list icon 534 and a group list icon 535 may display a list of persons or groups, respectively, when the corresponding icon is selected. A person list box 536 and group list box 537 list the persons or groups, respectively, that are given editor permission for the document series. The publisher may create a group composed of the persons and groups listed in the person and group list boxes 536, 537 by selecting a covert icon 540. The created group information is store on the UCF LDAP and aDb.

The notification information section 550 includes a text field 552 where the publisher can enter a notification message that is sent to the document series notification group when a document in the document series is modified or uploaded. The publisher may create or edit the membership in the notification group using the same methods described for creating or editing the group of people permitted to edit or upload documents to the document series.

The association information section 570 includes a text field 572 where the publisher can enter search terms that will present the document series to the end-user when the end-user enters one or more of the search terms into a search engine. A P&L field 574, Department field 576, and Division field 578 may be pre-populated with the publisher's P&L group, department, and division, respectively. The publisher may enter a different P&L, department, or division by directly entering it into the appropriate field or by selecting a list icon 579 adjacent to the field to display a list of P&Ls, departments, or divisions. The publisher may check an associate check box 580 that enables automatic association of the documents uploaded to the current folder with the document series.

Once the publisher is satisfied with the information displayed on the series popup window, the publisher may select a submit button 585 that performs a save operation on the document series information. The document series status component 123 may display a status window during the save operation and the document series confirm component 124 is displayed if the save operation is successful. The document series information may be used as default values when uploading a document such as, for example, shown in FIG. 4.

Figure 6:
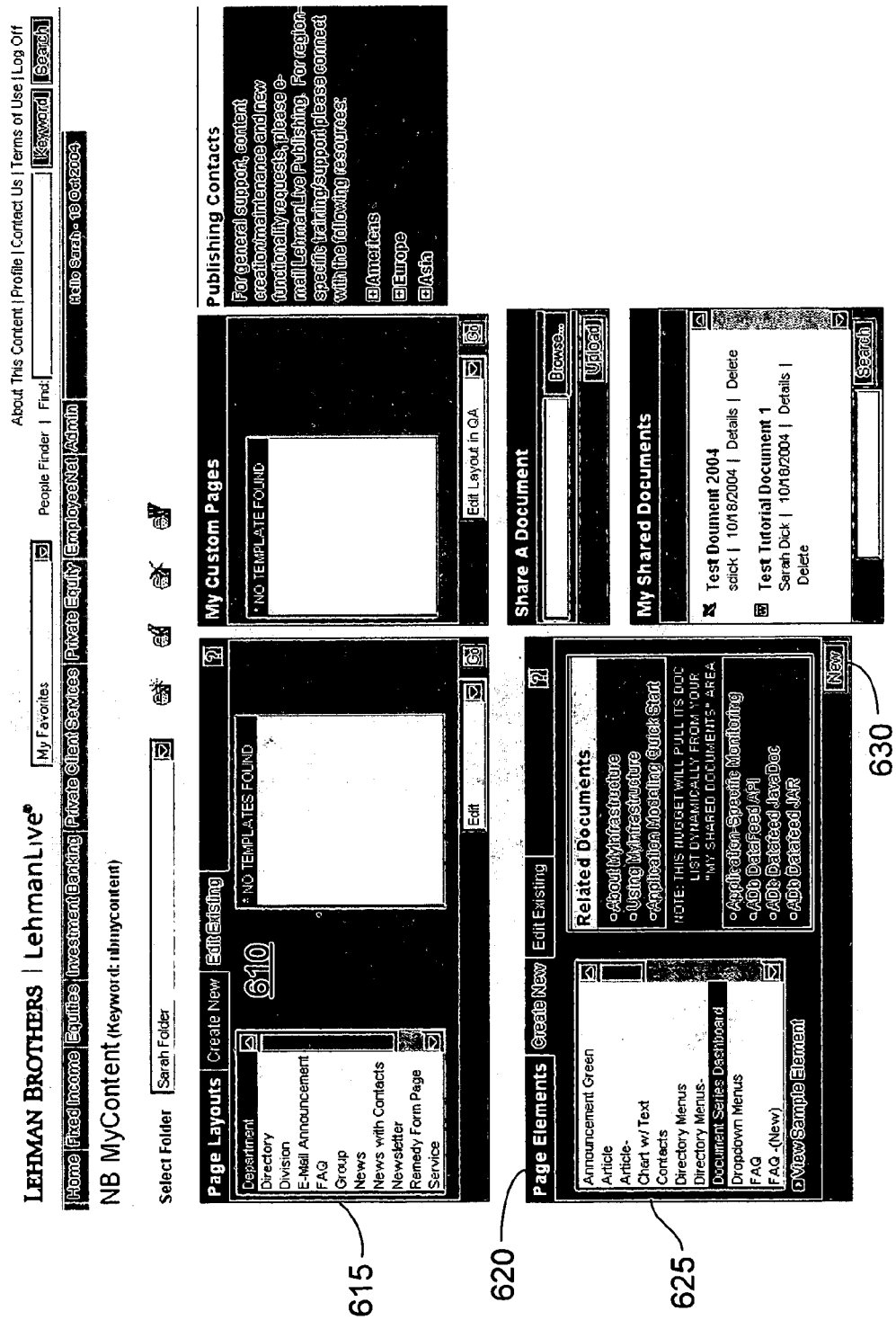
FIG. 6 is a portion of another web page presented to a publisher in an embodiment of the present invention.

FIG. 6 is a portion of a web page that is displayed to the publisher when the publisher creates a nugget such as, for example, a document series dashboard nugget. FIG. 6 displays a page layout nugget 610 that includes a list box 615 listing pre-formatted page layouts for selection by the publisher. A page elements nugget 620 includes a list box 625 listing pre-formatted page elements for selection by the publisher. The publisher may create a new document series dashboard nugget by selecting document series dashboard nugget from the page elements nugget 620 and selecting a new button 630. When the new button 630 is clicked, one or more popup windows may be displayed containing input fields where the publisher can enter information about the new nugget such as, for example, a document series nugget name, a width of the nugget, or whether the newly created nugget should be placed on a new page, existing page, or no page.

Figure 7:
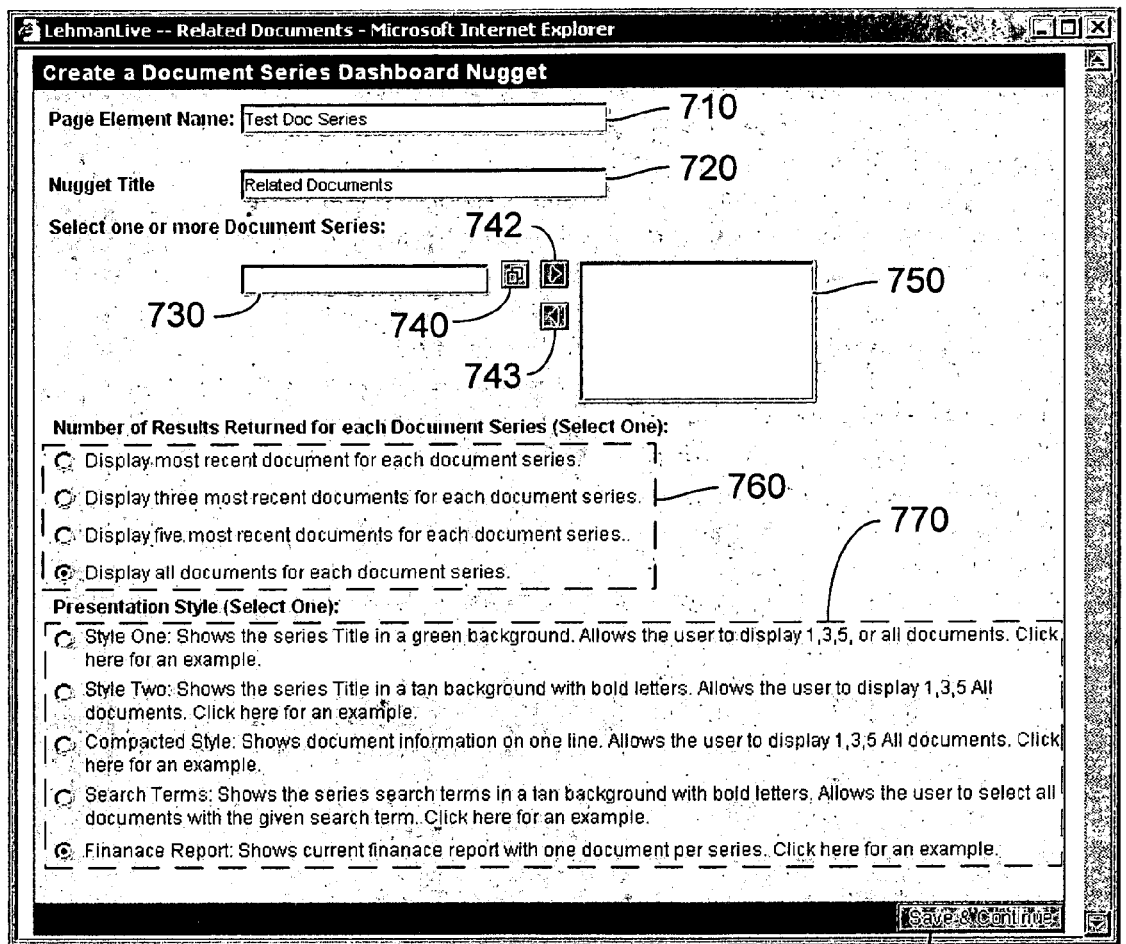
FIG. 7 is a portion of another web page or popup window presented to a publisher in an embodiment of the present invention.

FIG. 7 is a portion of a popup window that is displayed to the publisher when creating or editing a document series dashboard nugget. The window in FIG. 7 includes a name field 710 where the publisher can enter or edit the document series nugget name. A title field 720 allows the publisher to enter or edit the document series nugget title that is displayed in the nugget's title bar. The publisher may enter one or more document series that are displayed in the document series nugget by entering the document series in a text field 730 or by selecting a list button 740 and selecting a document series from a list of document series. Add and remove buttons 742, 743 may be clicked to add or remove a document series from a list 750 of document series that are displayed in the document series nugget. A number of documents displayed for each document series may be specified by the publisher by selecting one of a plurality of display choices 760. Similarly, the publisher may select one of a plurality of presentation styles 770. A save button 780 saves the document series nugget information.

Embodiments of the present invention comprise computer components and computer-implemented steps that will be apparent to those skilled in the art. For ease of exposition, not every step or element of the present invention is described herein as part of a computer system, but those skilled in the art will recognize that each step or element may have a corresponding computer system or software component. Such computer system and/or software components are therefore enabled by describing their corresponding steps or elements (that is, their functionality), and are within the scope of the present invention.

Having thus described at least illustrative embodiments of the invention, various modifications and improvements will readily occur to those skilled in the art and are intended to be within the scope of the invention. Accordingly, the foregoing description is by way of example only and is not intended as limiting. The invention is limited only as defined in the following claims and the equivalents thereto.

What is claimed:

1. A computer implemented method comprising the steps of:
   displaying a plurality of document series display sections; and
   displaying a plurality of document entries in each of the plurality of document series display sections, the document entries in each of the document series display sections corresponding to a document series, each of the document entries having a presentation state selected from a group comprising an expanded state and a contracted state, each of the document entries corresponding to a different document,
   the presentation state of the document entries being selectable by a user,
   wherein when the presentation state of one of the one or more document entries is the expanded state, displaying at least a name of an author of a document associated with the corresponding document entry and a plurality of user-selectable icons,
   wherein when the presentation state of the one of the document entries is in the contracted state, hiding the user-selectable icons,
   wherein when one of the user-selectable icons is selected, opening an email window, the email window including a link to the document,
   wherein when one of the user-selectable icons is selected, displaying the document entries in the document series display section corresponding to the document series,
   wherein each document series display section has a different document series publisher, wherein each publisher maintains editing control of one of the plurality of document entries corresponding to the document series.

2. The method of claim 1, wherein when the presentation state of one of the document entries is the contracted state, displaying at least a title and a publication date of the document associated with the one of the document entries.

3. The method of claim 1, further comprising associating each of the plurality of document series display sections with at least one document series.

4. The method of claim 3, wherein each of the plurality of document series display sections is associated with only one document series.

5. The method of claim 1, further comprising concurrently displaying in one document series display section at least one of the document entries in an expanded state and at least one of the document entries in a contracted state.

6. The method of claim 1, wherein when one of the user-selectable icons is selected, displaying document details for the document entry in a popup window.

7. The method of claim 1, wherein when one of the user-selectable icons is selected, deleting the document entry.

8. The method of claim 1, wherein the name of the author is a user-selectable icon and, when the name of the author is selected, opening an email window that enables the user to send an email to the author.

9. A system comprising:
   memory operable to store at least one program; and
   at least one processor communicatively coupled to the memory, in which the at least one program, when executed by the at least one processor, causes the at least one processor to:
   display a plurality of document series display sections; and display a plurality of document entries in each of the document series display sections, the plurality of document entries in each of the document series display sections corresponding to a document series, each of the document entries having a presentation state selected from a group comprising an expanded state and a contracted state, the presentation state of the document entries being selectable by a user, each of the document entries corresponding to a different document, wherein when the presentation state of one of the document entries is the expanded state, the at least one processor is further configured to display at least a name of an author of a document associated with the one of the document entries and a plurality of user-selectable icons, wherein when the presentation state of the one of the document entries is in the contracted state, the at least one processor is further configured to hide the user-selectable icons, wherein when one of the one or more user-selectable icons is selected, the at least one processor is further configured to open an email window, the email window including a link to the document, and wherein when one of the one or more user-selectable icons is selected, the at least one processor is further configured to display the document entries corresponding to the document series, wherein each document series display section has a different document series publisher, wherein each publisher maintains editing control of one of the plurality of document entries corresponding to the document series.

10. The system of claim 9, wherein when the presentation state of one of the document entries is the contracted state, the at least one processor is further caused to display at least a title and a publication date of the document associated with the one of the document entries.

11. The system of claim 9, wherein the at least one processor is further caused to associate each of the document series display sections with at least one document series.

12. The system of claim 11, wherein each of the document series display sections is associated with only one document series.

13. The system of claim 9, wherein the at least one processor is further caused to concurrently display in one document series display section at least one of the document entries in an expanded state and at least one of the document entries in a contracted state.

14. The system of claim 9, wherein when one of the one or more user-selectable icons is selected, the at least one processor is further caused to display document details for the document entry in a popup window.

15. The system of claim 9, wherein when one of the one or more user-selectable icons is selected, the at least one processor is further caused to delete the document entry.

16. The system of claim 9, wherein the name of the author is a user-selectable icon and, when the name of the author is selected, the at least one processor is further caused to open an email window that enables the user to send an email to the author.

17. A non-transitory computer readable storage medium having stored thereon computer executable instructions which, when executed on a computer, configure the computer to perform a method comprising:

displaying a plurality of document series display sections; and displaying a plurality of document entries in each of the at least two document series display sections, the document entries in each of the document series display sections corresponding to a different document series, each of the document entries having a presentation state selected from a group comprising an expanded state and a contracted state, the presentation state of the document entries being selectable by a user, each of the document entries corresponding to a different document, wherein when the presentation state of one of the one or more document entries is the expanded state, the method further comprising displaying at least a name of an author of a document associated with the one of the document entries and a plurality of user-selectable icons, wherein when the presentation state of the one of the document entries is in the contracted state, the method further comprising hiding the user-selectable icons, wherein when one of the user-selectable icons is selected, the method further comprising opening an email window, the email window including a link to the document, and wherein when one of the user-selectable icons is selected, the method further comprising displaying the document entries corresponding to the document series, wherein each document series display section has a different document series publisher, wherein each publisher maintains editing control of one of the plurality of document entries corresponding to the document series.

18. The non-transitory computer readable storage medium of claim 17, wherein when the presentation state of one of the document entries is the contracted state, the method further comprises displaying at least a title and a publication date of the document associated with the one of the document entries.

19. The non-transitory computer readable storage medium of claim 17, wherein the method further comprises associating each of the document series display sections with at least one document series.

20. The non-transitory computer readable storage medium of claim 19, wherein each of the at least two document series display sections is associated with only one document series.

21. The non-transitory computer readable storage medium of claim 17, wherein the method further comprises concurrently displaying in one document series display section at least one of the document entries in an expanded state and at least one of the document entries in a contracted state.

22. The non-transitory computer readable storage medium of claim 17, wherein when one of the user-selectable icons is selected, the method further comprises displaying document details for the document entry in a popup window.

23. The non-transitory computer readable storage medium of claim 17, wherein when one of the user-selectable icons is selected, the method further comprises deleting the document entry.

24. The non-transitory computer readable storage medium of claim 17, wherein the name of the author is a user-selectable icon and, when the name of the author is selected, the method further comprises opening an email window that enables the user to send an email to the author.

\* \* \* \* \*